United States Patent [19]

Wayama et al.

[11] Patent Number: 4,896,262

[45] Date of Patent: Jan. 23, 1990

[54] EMULATION DEVICE FOR CONVERTING MAGNETIC DISC MEMORY MODE SIGNAL FROM COMPUTER INTO SEMICONDUCTOR MEMORY ACCESS MODE SIGNAL FOR SEMICONDUCTOR MEMORY

[75] Inventors: Yukio Wayama, Numazu; Naoto Miyajima, Shizuoka; Michio Shinozaki; Kazunari Yashima, both of Numazu, all of Japan

[73] Assignee: Kabushiki Kaisha Meidensha, Tokyo, Japan

[21] Appl. No.: 704,520

[22] Filed: Feb. 22, 1985

[30] Foreign Application Priority Data

Feb. 24, 1984 [JP] Japan .................................. 59-33798
Feb. 24, 1984 [JP] Japan .................................. 59-33801
Feb. 24, 1984 [JP] Japan .................................. 59-33802

[51] Int. Cl.$^4$ .......................... G06F 3/05; G06F 5/00; G06F 13/00
[52] U.S. Cl. ................................. 364/200; 364/232.9; 364/249; 364/248.1; 364/238.4; 364/236.2; 364/264.3; 364/221.2
[58] Field of Search ... 364/200 MS File, 900 MS File

[56] References Cited

U.S. PATENT DOCUMENTS

| | | | |
|---|---|---|---|
| 4,136,386 | 1/1979 | Annunziata | 364/200 |
| 4,148,098 | 4/1979 | McCreight | 364/200 |
| 4,159,534 | 6/1979 | Getson | 364/200 |
| 4,210,959 | 7/1980 | Wozniak | 364/200 |
| 4,215,400 | 7/1980 | Denko | 364/200 |
| 4,295,205 | 10/1981 | Kunstadt | 364/900 |
| 4,338,644 | 7/1982 | Staar | 360/69 |
| 4,399,503 | 8/1983 | Hawley | 364/200 |
| 4,456,971 | 6/1984 | Fukuda et al. | 364/900 |
| 4,467,421 | 8/1984 | White | 364/200 |

*Primary Examiner*—Archie E. Williams, Jr.
*Assistant Examiner*—Emily Y. Chan
*Attorney, Agent, or Firm*—Foley & Lardner, Schwartz, Jeffery, Schwaab, Mack, Blumenthal & Evans

[57] ABSTRACT

A semiconductor backing storage device is connected to a computer system accessible only in magnetic disc access mode for improvement in access time. In transferring information data between the computers and the semiconductor backing storage device, access control command signals peculiar to magnetic disc access mode are all disregarded and address data peculiar to magnetic disc access mode are converted into those necessary for semiconductor memory mode in writing or reading information data. To further decrease access time, one-word buffers are provided for a semiconductor backing storage controller and the backing storage device, so that the preceding data are transferred from the buffers while the current data are transferred to the buffers after necessary processing. The semiconductor backing storage memory is also usable for a multicomputer system by providing cross-call function for the semiconductor backing storage controller.

12 Claims, 9 Drawing Sheets

EMULATION DEVICE FOR CONVERTING MAGNETIC DISC MEMORY MODE SIGNAL FROM COMPUTER INTO SEMICONDUCTOR MEMORY ACCESS MODE SIGNAL FOR SEMICONDUCTOR MEMORY

BACKGROUND OF THE INVENTION

1. Field of the Invention

The present invention relates generally to backing (bulk, auxiliary or secondary) storage devices and more particularly to semiconductor backing storage devices incorporated with a computer system or a multicomputer system. Generally, the backing storage device can store a great capacity of information data, but has shortcomings such that the access time is slow when compared with that of the main (internal or immediate access) memory arranged within the computer system.

2. Description of the Prior Art

Conventionally, magnetic disc storage devices are usually incorporated with a computer system as backing storage memory. This is because the magnetic disc storage devices are of random access storage which can store a great capacity of information data. Here, the random access means direct access in which any locations designated by addresses can be accessed (data are searched) within the same access time irrespective of the preceding access address.

The magnetic disc storage device is made up of a plurality of discs rotating at a constant speed and a series of magnetic arms each provided with one or more reading/writing heads. Magnetic paint material is applied on both the surfaces of the disc. Information data are magnetically written in or read out of the disc surface by bringing the arm head near the surface of the rotating disc. The arm head can be moved to any required areas (recording tracks) of the disc surface in accordance with an instruction. Each disc surface has a great number of recording tracks, and the tracks are further divided into a great number of sections or sectors. In access to the above-mentioned magnetic disc device, it inevitably takes an access time of approximately 40 milliseconds. This is because there exist a waiting time (latency) of the disc, (from the time when a data transfer command signal is output to the time when a designated sector on a rotating disc comes near the head) and a head seek time (from the time when a data transfer command signal is output to the time when the head moved radially with respect to the disc comes near a designated track of a rotating disc). The access time of the magnetic disc is much longer than that of the main memory arranged within a computer system.

Therefore, in the case where a computer system connected to a magnetic disc backing storage device is used for a process control system, for instance, which requires a high response speed, although a great capacity of information data can be transferred, since the access time is longer, it is impossible to efficiently control the process control system by the computer. In such a case as described above, another computer system provided with a magnetic disc backing storage device should be combined with the process control system to transfer necessary information data from the control systems to the magnetic disc devices in idle time, thus resulting in problems in that another computer system should additionally be arranged and further anther means for combining the process control system with the computer systems is additionally required.

Further, the difference in access time between computer main memory and magnetic disc backing storage device causes mismatching in data transfer; that is, data transferred from the computer to the backing storage are not well synchronized with those transferred from the magnetic disc backing storage to the computer. To overcome the above-mentioned drawbacks, in general FIFO (first-in first-out) buffers having a capacity of several words (bytes) are disposed in the interface between the computer and the backing storage. However, these buffers will not reduce the access time itself of the magnetic disc backing storage, but only attains the matching or synchronization between the two.

On the other hand, multicomputer systems are well known. The system is made up of a plurality of computers, in which the main computer executes various complex operations or calculations while other computers execute input/output control or routine jobs under the supervisory control of the main computer. To link plural computers, that is, to transfer information data between or among the computers, communication control systems, shared memory systems and cross-call magnetic disc systems have conventionally been utilized. In the case of the computer link based on a communication control system, it is impossible to transfer data at high speed, because there exists a long data transferring time or overhead times (indirect times required for decisions) in communication protocol (software procedures).

In the case of computer link based on the shared memory system, since a part of the main memory arranged within the main computer is often used as the shared memory in order to facilitate the operations, it is impossible to increase the capacity of the shared memory infinitely because the memory capacity in the main computer is not limitless.

In the case of cross-call magnetic disc devices, although the storage capacity can be increased almost limitlessly, since a relatively long access time of approximately 40 milliseconds is required due to the waiting time of the rotating magnetic discs and head seek time of the shifted arm head, it is impossible to transfer information data at high access speed.

SUMMARY OF THE INVENTION

With these problems in mind therefore, it is the primary object of the present invention to provide a semiconductor backing storage device which can store a great capacity of information data and can transfer information data at high access speed in magnetic disc access mode so as to be connectable to a computer system already configured in magnetic disc access mode.

Further, it is another object of the present invention to provide the semiconductor backing storage device which can store a great capacity of information data and can transfer information data at high access speed between the computer and the backing storage device under synchronization of the data transferred between the two.

Furthermore, it is the other object of the present invention to provide the semiconductor backing storage device which can store a great capacity of information data and can transfer information data at high access speed in a magnetic disc access mode so as to be connectable to a multicomputer system already configured in magnetic disc access mode.

To achieve the above-mentioned first object, the backing storage device according to the present invention comprises a semiconductor backing storage means for storing a great capacity of information data as an auxiliary storage means, and a backing storage control means connected between a computer and the semiconductor backing storage means, said control means transferring information data in magnetic disc access mode between the computer and said control means and in semiconductor memory access mode between said control means and said semiconductor backing storage means. In transferring information data between the computer and said semiconductor backing storage means, said backing storage control means omits or prepares access control command signals peculiar to the magnetic disc access mode and converts address data peculiar to the magnetic disc access mode into those necessary for the semiconductor memory access mode.

To achieve the above-mentioned second object, the backing storage device according to the present invention comprises one-word buffer means arranged, respectively, in computer bus driver/receiver means and storage bus driver/receiver means for temporarily storing information data in transferring data between the computer and said semiconductor backing storage means in order that the succeeding data address is converted and transferred to the buffer means while the current data are transferred from the buffer means. In addition, the backing storage device according to the present invention comprises one-word buffer means arranged in said semiconductor backing storage means for temporarily storing information data in transferring data between said backing storage control means and said semiconductor storage means in order that the succeeding data are ECC processed and transferred to the buffer means while the current data are transferred from the buffer means.

To achieve the above-mentioned third object, the semiconductor backing storage means according to the present invention comprises semiconductor array control means including a first data logic port means for temporarily storing address data and information data supplied from a first backing storage controller means; a second data logic port means for temporarily storing address data and information data supplied from a second backing storage controller means; a control logic port means for storing and outputting control signals of READ, WRITE and WRITE CHECK supplied from said two backing storage control means separately; and cross-call control means for designating one of said two data logic port means in response to the control signals output from said control logic port means under priority or first-in first-out condition, designating specific addresses in semiconductor storage means for data output from said designated data logic port means, and interlocking the address data and information data stored in one of said two data logic ports in case both said two backing storage control means generate access signals to said shared backing storage means simultaneously.

BRIEF DESCRIPTION OF THE DRAWING

The features and advantages of the backing storage device according to the present invention will be more clearly appreciated from the following description of the preferred embodiment of the invention taken in conjunction with the accompanying drawings in which like reference numerals designate the same or similar elements or sections throughout the figures thereof and in which.

DETAILED DESCRIPTION OF THE PREFERRED EMBODIMENTS

Figure 1:
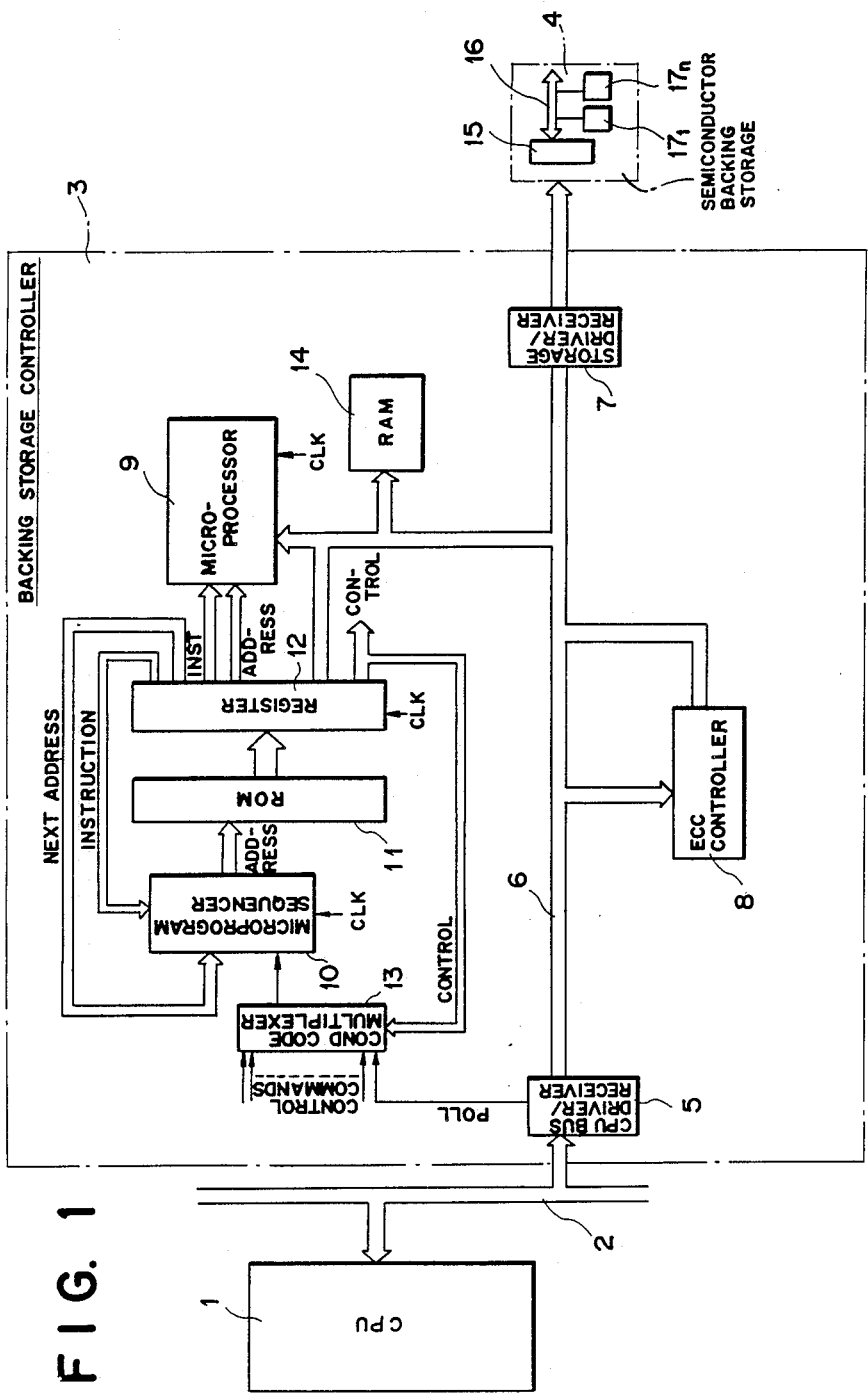
FIG. 1 is a schematic block diagram showing a backing storage controller according to the present invention, which is arranged between a CPU of a computer system and a semiconductor backing storage device.

With reference to FIG. 1, a preferred embodiment of the present invention will be described hereinbelow. A computer system is roughly made up of a central processing unit (CPU) or a computer 1 including a CPU or computer bus 2 for transferring plural control signals and information data to and from the CPU 1 in a lump or group a backing storage controller 3, and a semiconductor backing storage unit 4, as shown in FIG. 1. The backing storage controller 3 serves as an interface between the CPU 1 and the semiconductor backing storage unit 4, so that a great capacity of information data are transferred between the two under the control of the backing storage controller 3. The transfer operation between the two is implemented in response to instructions or command signals generated by the storage controller 3. Here, it should be noted that the transfer control command signals derived from the CPU 1 are in the same access mode as that of magnetic disc devices. In transferring data between the computer side and the backing storage side, the storage controller 3 omits some access control command signals peculiar to magnetic disc access mode and converts address data peculiar to magnetic disc access mode into those necessary for semiconductor memory access mode. In more detail, the backing storage controller 3 emulates (imitates) a magnetic disc backing storage controller. The controller 3 is an intelligent controller having direct memory access functions and interrupt functions, which includes a microprocessor operated in accordance with control microprogram stored in a ROM arranged therewithin. Here, intelligence means that the storage controller 3 can improve the performance by repeatedly implementing the transfer operations on the basis of calculations, decisions, checking functions, etc. In practice, the storage controller 3 can transfer for itself data between the internal memory in the CPU 1 and the backing storage 4 without depending upon control of the CPU 1 (i.e. direct memory access) or interrupt for itself data transfer operation in case errors are checked out (interrupt function).

In the usual magnetic disc backing storage devices, a host interface (magnetic disc controller or CPU) is disposed between the computer system and the magnetic disc backing storage devices. The above host-interface can access to magnetic disc devices by designating a cylinder address, track address, head address and a sector address. The cylinder address decides a phantom cylinder formed by a plurality of equidiameter tracks of separate discs. The head address decides an arm head accessible to a disc. Therefore, it is also possible to consider that the head address and the track address designate one magnetic disc and the cylinder address designates one track on the designated discs. Once the disc and the track have been designated, the number of sector pulses are counted by the magnetic head. The instant the number of sector pulses matches the sector address, a header (a set of data placed on top of a collection of data, which includes an identifier) is read out and then designated data are transferred.

In addition to the above-mentioned address data, other transfer control command signals are necessary in magnetic disc access mode. These access control command signals are SEEK, READ, WRITE, READ HEADER, WRITE CHECK and further SELECT DRIVE, PACK ACKNOWLEDGE, DRIVE CLEAR, UNLOAD, START SPINDLE, RECALIBRATE, OFF-SET, WRITE HEADER, etc.

In the storage controller 3, the access control command signals other than SEEK, READ, WRITE, READ HEADER, and WRITE CHECK are omitted. Further, the address data peculiar to magnetic disc mode are CYLINDER, TRACK, HEAD, and SECTOR; the address data peculiar to semiconductor access mode are ROW ADDRESS and COLUMN ADDRESS.

The configuration and the operation of the backing storage controller 3 will be described in detail hereinbelow. The controller 3 is made up of a computer bus driver/receiver 5, an internal bus 6, a storage bus driver/receiver 7, an error correction code controller 8, a microprocessor 9, a microprogram sequencer 10, a read-only memory 11, registors 12, a condition code multiplexer 13, and a random-access memory 14.

The computer bus driver/receiver 5 is disposed between the computer bus 2 and the internal bus 6 of the controller 3. This driver/receiver 5 receives from the CPU 1 data access control command signals, address data prepared in magnetic disk access mode, and information data to be written in the backing storage unit 4, and transmits to the CPU 1 control signals of DMA (direct memory access) and INTERRUPT (interrupt), address data prepared in magnetic disc access mode and information data to be read from the backing storage unit 4.

The storage bus driver/receiver 7 is disposed between the internal data bus 6 and the semiconductor backing storage unit 4. This driver/receiver 7 receives information data read from said backing storage unit 4, and transmits control command signals of READ, WRITE, WRITE CHECK, address data necessary for semiconductor memory access, and information data to be written in the backing storage unit 4.

The error correction code controller 8 is connected to the internal data bus 6. This controller 8 adds an automatic error correction code (ECC) to data for each sector (which is sent from the CPU 1) and prepares data to be written into the backing storage unit 4. Further, this controller 8 checks the automatic error correction code (ECC) added to the data for each sector (which is read out of the unit 4) and further supplies information necessary for correcting erroneous data in case of the presence of an error. Here, it should be noted that it is possible to check the reasonableness of data on the basis of automatic error correction codes.

The above error correction code can not only detect an occurrence of error but also correct the detected error data to provide correct data in the case where the detected error satisfies a predetermined condition. As an example, it is possible to give hamming code. In this method, each character is so expressed in codes as to have a minimum hamming distance (signal distance) from any other characters. Further, as described later, an automatic error correction code controller is provided in an interface within the backing storage unit 4, in which each data word is automatically corrected.

The computer bus driver/receiver 5 outputs access control command signals (READ, WRITE) to the condition code multiplexer 13, to which various control command signals generated within the backing storage controller 3 are inputted. This multiplexer 13 poll-scans the access control command signals from the computer bus driver/receiver 5 together with other control command signals in order to check sequentially whether the CPU 1 outputs an access request command signal. When checking the presence of access request command signal, the multiplexer 13 outputs an access command signal.

In response to this access command signal and clock pulse signals CLK, the microprogram sequencer 10 generates microprogram address designation signals in sequence. In response to these microprogram address designation signals, the microprogram is derived from the read-only memory 11.

Further, the conditions here means various states to be executed by the microprocessor 9. The poll means a method of avoiding contention.

The microprocessor 9 executes data transfer operations (WRITE, READ) to or from the backing storage unit 4 in response to information transfer request command signals in accordance with microprogram stored in the microprogram memory (ROM) 11. The above microprogram is formed by plural machine language sets and executes desired microinstructions in response to clock pulse signals. That is to say, the microprogram is read out from the microprogram memory (ROM) 11 on the basis of microprogram address designation signals generated by the microprogram sequencer 10, transferred to the register 12, and then given to the microprocessor 9 from the register 12 as microinstructions in response to clock pulse signals CLK applied to the register 12.

The register 12 which receives the microprogram from the ROM 11 gives back necessary information such as instructions and the succeeding sequencer address to the microprogram sequencer 10. In order to generate the microprogram designation addresses in sequence, the sequencer 10 receives information from the condition code multiplexer 13.

The parameter memory (RAM) 14 stores temporarily various signals indicative of address, data, control, etc. given from the internal data bus 6 and outputs these necessary signals to the microprocessor 9 at appropriate timing.

Figure 2:
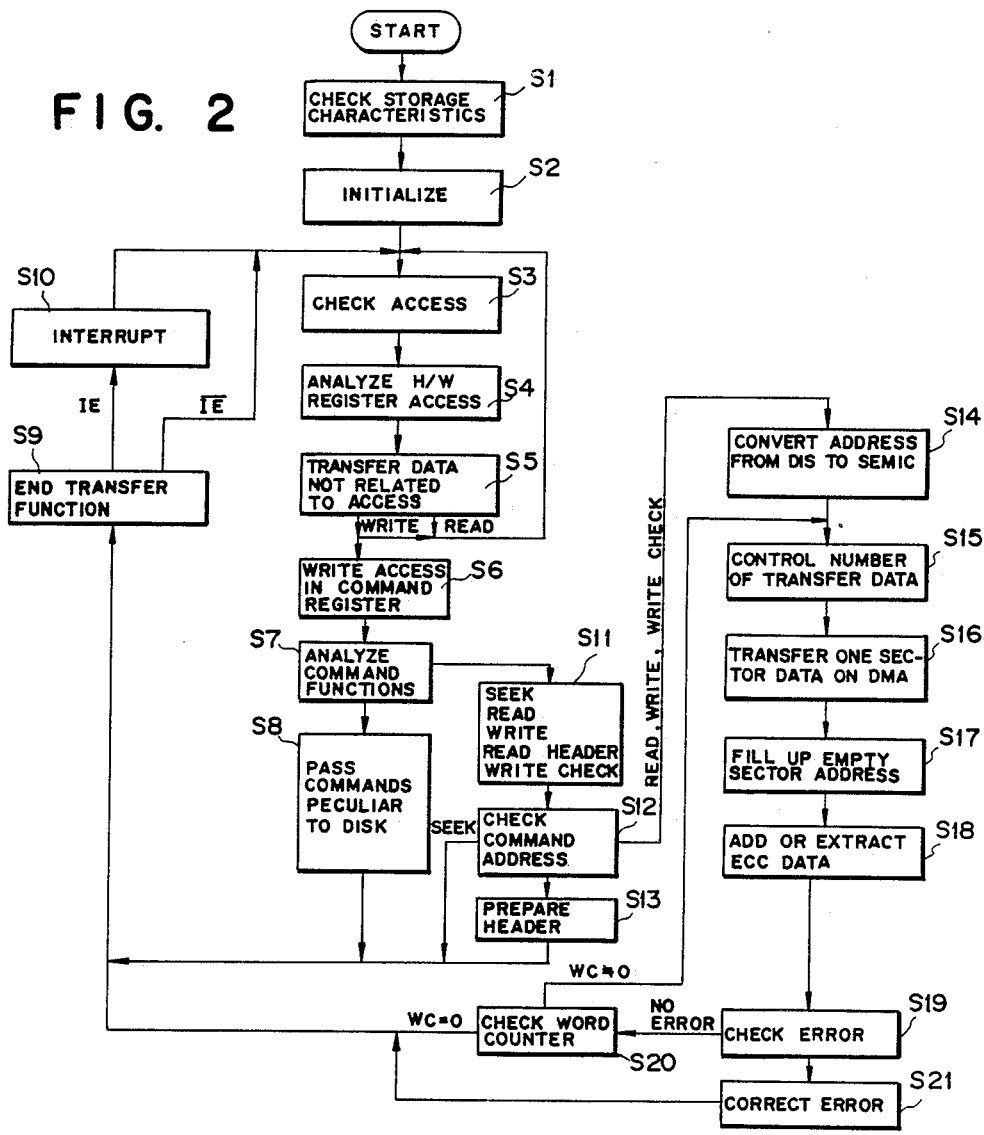
FIG. 2 is a control flowchart of the backing storage controller shown in FIG. 1, which represents the control steps of transferring information data in magnetic discs access mode between the computer and the storage controller but in semiconductor memory access mode between the storage controller and the semiconductor backing storage.

The program control executed in the backing storage controller 3 will be described in detail with reference to a flowchart shown in FIG. 2. The control program first reads the characteristics of the backing storage unit 4 (e.g. the number of semiconductor elements, the configuration mode thereof, the capacity thereof, the access mode thereof, etc.) (in step $S_1$). That is to say, in this step, the number of semiconductor storage units and the capacity (megabyte memory modules) of semiconductor unit are checked and read in dependence upon the positions of switches attached to the storage unit 4. Control initializes the register 12 and other internally incorporated registers (in step $S_2$).

Control allows the condition code multiplexer 13 to check whether the CPU bus driver/receiver 5 receives an access command signal from the CPU 1 in accordance with poll scanning method (in step $S_3$). Once control recognizes the presence of an access command signal from the CPU 1, control first analyzes the contents of hardware register incorporated within the storage controller 3, in which access command signals not related to data transfer between the CPU 1 and the backing storage 4 are temporarily stored (in step $S_4$).

In step $S_5$, if the contents of the hardware register is a read request not related to data transfer between CPU 1 and unit 4, data corresponding to the read request are sent from the RAM 14 to the CPU 1 through the computer bus driver/receiver 5, and thereafter control returns to step $S_3$ above. The above steps from $S_3$ to $S_5$ are executed repeatedly.

In step $S_5$, if the contents of the hardware register is a write request not related to data transfer between CPU 1 and unit 4, data corresponding to the write request are sent from the CPU 1 to the RAM 14 through the computer bus driver/receiver 5, and thereafter control returns to step $S_3$ above. The above steps from $S_3$ to $S_5$ are executed repeatedly.

In step $S_5$, if the contents of the hardware register is a read or write request related to data transfer between CPU 1 and unit 4, these requests are written in command registers (in step $S_6$). Control analyzes the access functions stored in the command register (in step $S_7$). If the analyzed access functions of the control command signals are peculiar to magnetic discs, that is, not required for the semiconductor disc element, these non-required command signals are passed without any processings (in step $S_8$) and control ends data transfer functions (in step $S_9$). Command signals to be passed in this step $S_8$, are SELECT DRIVE (to drive a selected disc), PACK ACKNOWLEDGE (to select one of several discs), DRIVE CLEAR (to return to its initial condition), UNLOAD (to return a head to an initial unaccessible position), START SPINDLE (to start a spindle motor), RECALIBRATE (to calibrate the whole disc condition), OFFSET (to offset a head position from a reference value), WRITE HEADER (a header data peculiar to discs), etc.

In step $S_9$, if interrupt processing is required due to the presence of an error, for instance, control informs the CPU 1 of the end of data transfer operation by interrupting the operation (in step $S_{10}$), returning to step $S_3$. If no interrupt processing is required, control directly returns to step $S_3$.

In step $S_7$, if the analyzed command functions are SEEK (to select and move a head), READ (to read data), WRITE (to write data), READ HEADER (to read header data), WRITE CHECK (to check written data) (in step $S_{11}$), the addresses of these command signals are checked. If the checked address is not correct, control outputs SEEK to return to the transfer function end processing of step 9 (in step 12). If the checked address is correct and control reads READ HEADER, control prepares header data in magnetic disc access mode on the basis of calculations executed by the microprocessor 9 in accordance with microprogram. The prepared header data are sent to the CPU 1 through the CPU bus 2 in dependence upon direct memory access (in step 13). Thereafter, control returns to transfer function end processing of step 9.

In step $S_{12}$, if the instructions (READ, WRITE, WRITE CHECK) are correct, control converts a magnetic disc address accessible to the CPU 1 into a semiconductor memory address accessible to the semiconductor storage unit 4 (in step $S_{14}$).

This conversion step is also executed in accordance with a microprogram stored in the ROM 11 and on the basis of the backing storage characteristics already detected in step $S_1$ above. The magnetic disc address data include sector recognizing data such as preamble, postamble, and ID (identification label); however, the semiconductor storage unit 4 does not require such data. In this system, the address data necessary in magnetic disc access mode are CYLINDER, TRACK, HEAD, and SECTOR; the address data necessary in semiconductor access mode are ROW ADDRESS and COLUMN ADDRESS.

In accordance with the address data converted in step 14, control checks whether the number of transferred data exceeds the number storable in one sector or not (in step $S_{15}$). If the number exceeds the one storable in one sector, the succeeding sector is automatically selected. Thereafter, data are transferred (read, written and write checked) between the CPU 1 and the semiconductor storage unit 4 on the basis of direct memory access transfer method per sector without depending upon the control of the computer or CPU 1 (in step $S_{16}$). When data are written in each sector, there exists a case where all the addresses of one sector are not filled up by the data and some addresses are left unwritten. Therefore, after the data for each sector have been transferred, the remaining empty addresses are filled up by an appropriate digit (e.g. "0") (in step $S_{17}$).

Thereafter, in the case where data are written in the semiconductor unit 4, an error correction code is added to the transferred data by means of the error code correction controller 8; in the case where data are read out of the semiconductor unit 4, the added error correction code is extracted (in step $S_{18}$). Further, control checks whether there exists an error on the basis of the error correction code (in step 19). If no error is found in step 19, control checks whether a word counter reaches zero or not (in step $S_{20}$). This word counter is set in the microprocessor 9 in response to a command signal supplied from the CPU 1. If this word counter reaches zero, since the necessary number of words have been transferred, control returns to data transfer function end (in step $S_9$). If this word counter does not reach zero, since the number of words are not sufficient, control returns to step 15 for further transferring data stored in the succeeding sector. Further, in step $S_{19}$, if an error is detected on the basis of error correction code, the detected error is automatically corrected (in step $S_{21}$). Thereafter, control ends data transfer function (in step $S_9$). In this case, if interruption is necessary due to error, for instance, control interrupts the succeeding processing (in step $S_{10}$) and returns to step $S_3$ for repeating the same transfer operations. If interruption is unnecessary, control directly returns to step $S_3$ for continuously repeating the same transfer operations.

As described above, although the CPU 1 requests data transfer to the backing storage unit 4 in magnetic disc access mode, since the storage controller 3 omits control data peculiar to magnetic disc access mode and converts address data peculiar to magnetic disc access mode into those peculiar to semiconductor element access mode, it is possible to directly transfer information data between the CPU 1 and the semiconductor unit 4.

Figure 3:
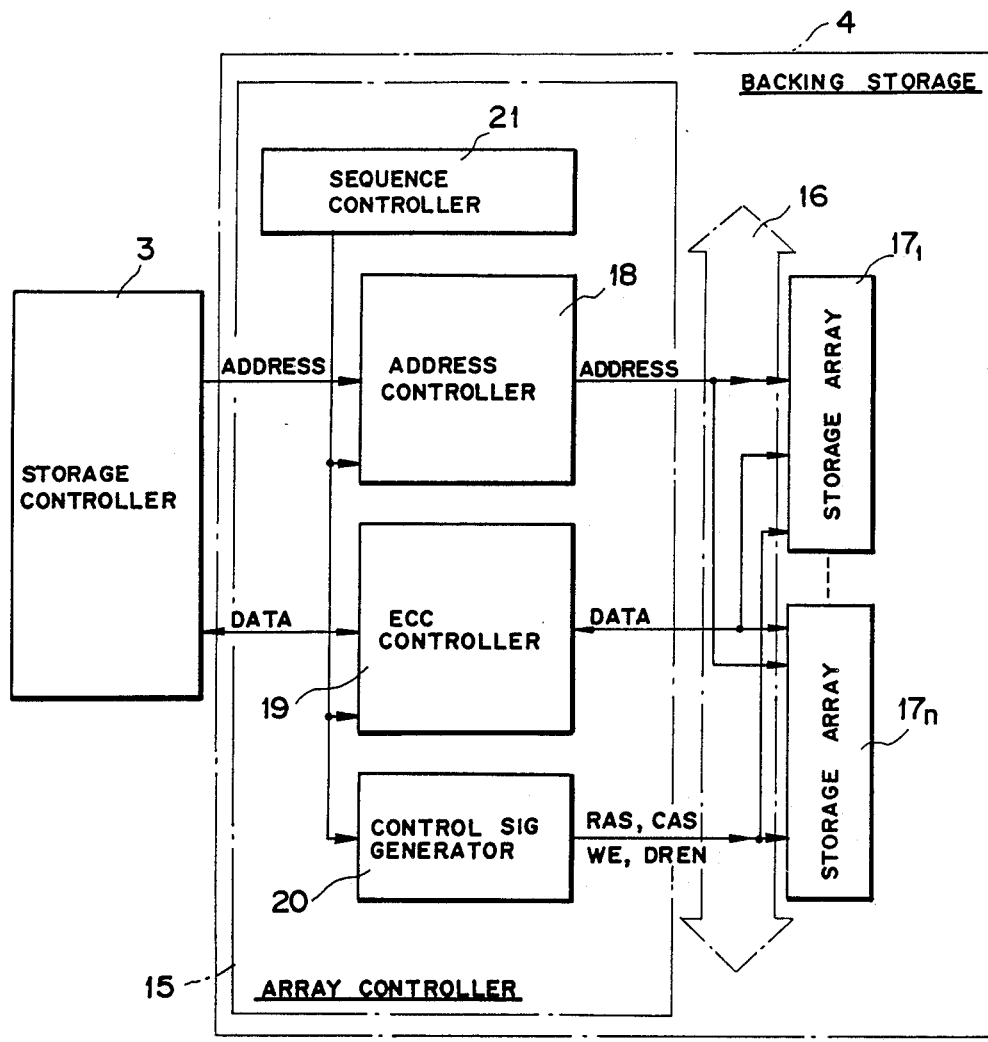
FIG. 3 is a schematic block diagram showing the semiconductor backing storage according to the present invention, which is made up of an array controller and a plurality of semiconductor storage arrays.

The configuration and operation of the semiconductor backing storage unit 4 shown in FIG. 1 will be described in detail with reference to FIG. 3. The backing storage unit 4 is roughly made up of a storage array controller 15, a bus 16, and plural semiconductor memory arrays $17_1, \ldots 17_n$. Further, the storage array controller 15 is made up of an address controller 18, an ECC (error correction code) controller 19, a control signal generator 20, and a sequence controller 21.

The address designation data are applied through the backing storage driver/receiver 7 from the storage controller 3 to the address controller 18 incorporated within the semiconductor array controller 15. On the other hand, data to be read or written are transferred through the same storage driver/receiver 7 between the storage controller 3 and the word error correction code (ECC) controller 19 incorporated within the semiconductor array controller 15.

The address controller 18 selects an area allocated to one of the storage arrays $17_1 \ldots 17_n$ on the basis of the address data supplied from the storage controller 3 and outputs address selection signals together with the address designation signals. The ECC controller 19 adds a word error correction code (WORD ECC) to data to be written and extracts a word error correction code included in read data. In case an error is found, the controller 19 automatically corrects data to be transferred and transfers the corrected data between the storage controller 3 and the storage arrays $17_1 \ldots 17_n$.

The control signal generator 20 generates various control signals necessary for writing and reading data into or out of the storage arrays $17_1 \ldots 17_n$. These control signals are, for instance, row address strobe signal (RAS), column address strobe signal (CAS), write enable signal (WE), read-enable signal (RE), and drive-enable signal (DREN) in the case where a dynamic RAM is used for the semiconductor storage unit 4. Here, strobe signals is a kind of clock signals to activate rows or columns sequentially.

The sequence controller 21 controls input/output operation sequence of the controllers 18 and 19 and the control signal generator 20. In summary, the storage array controller 15 is connected to the storage arrays $17_1 \ldots 17_n$ via the bus 16 in order to designate addresses of the arrays and to control reading and writing of data between the storage controller 3 and the storage arrays 17.

In this connection, when the backing storage unit 4 is volatile memory such as dynamic semiconductor memory, since the stored data are destroyed when the power supply is off, it is necessary to provide a battery backup apparatus for the backing storage unit 4.

Figure 4:
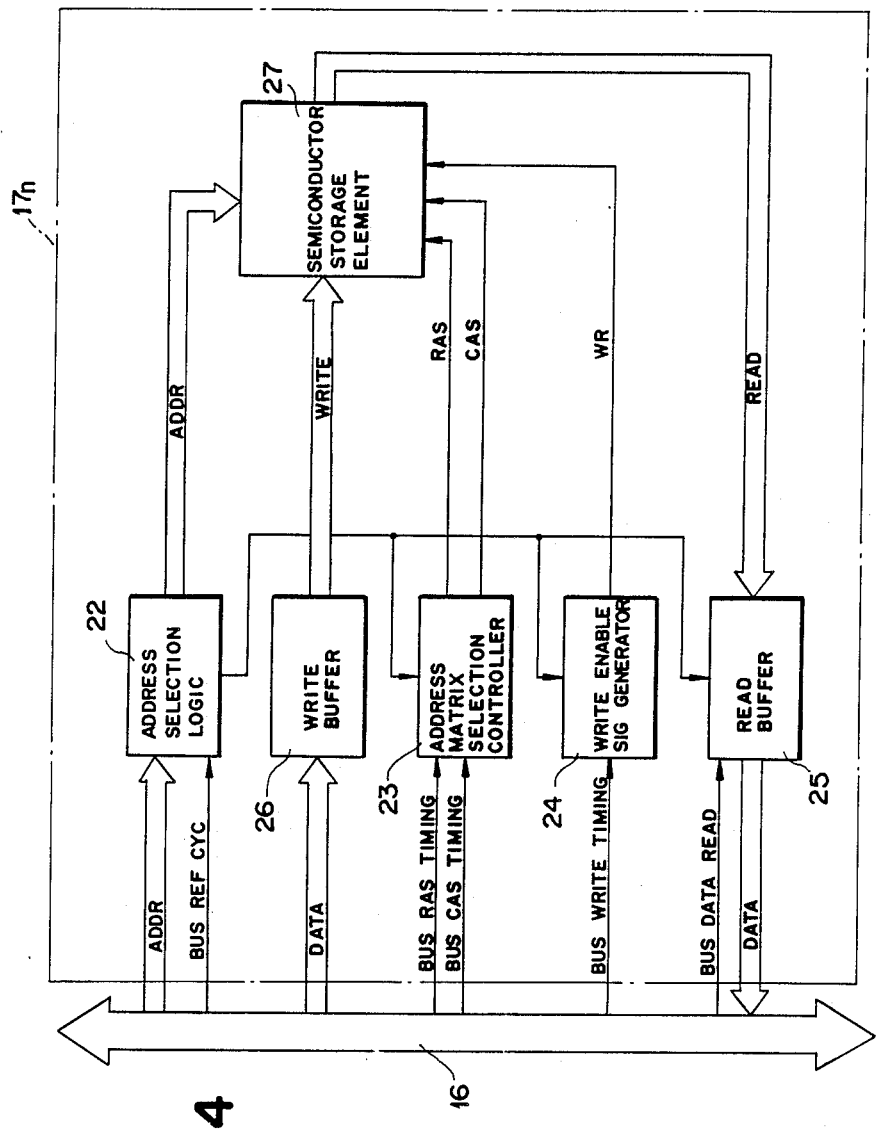
FIG. 4 is a schematic block diagram showing the semiconductor storage array according to the present invention, which is made up of a semiconductor storage element, a logic circuit, a controller, a generator and buffers.

A semiconductor storage $17_n$ of dynamic RAM type will be described in detail with reference to FIG. 4. The storage 17 includes an address selection logic circuit 22, a write buffer 26, an address matrix selection controller 23, a write-enable signal generator 24 and a read buffer 25.

The address selection logic circuit 22 is connected between the address controller 18 and the semiconductor storage element 27 and generates address data signals to the storage element 27 in response to address data signal outputted from the address controller 18 and bus reflesh cycle signals.

The address matrix selection controller 23 is connected between the control signal generator 24 and the storage element 27 and to the address election logic circuit 22 and generates row address selection strobe signals (RAS) and column address selection strobe signals (CAS) in sequence to the storage element in response to these strobe signals (RAS, CAS) and in synchronization with the address data signal.

The write enable signal generator 24 is connected between the control signal generator 20 and the storage elements 27 and to the address selection logic circuit 22 and generates write control signal (WR) to the storage element 27 in response to the write enable signal (WE) and in synchronization with the address data signal.

The write buffer 26 is connected between the error correction code controller 19 and the storage element 27 and writes information data in the storage element 27 in response to the write control signal (WR) applied from the write enable signal generator 24 to the element 27.

The read buffer 25 is connected between the control signal generator 20 and the error correction code controller 19, and the storage element 27 and to the address selection logic circuit 22 and reads information data from the storage element 27 in response to the data read signal (RE) and the address data signal.

The second feature of the present invention will be described hereinbelow with reference to FIGS. 5 and 6.

When a magnetic disc is incorporated with a computer system as a backing storage device, since there exist waiting time and head seek time due to the mechanical structure of the magnetic disc, the computer system does not synchronize with the magnetic disc backing storage in transferring information data from the computer system to the magnetic disc or vice versa. In order to overcome the above problems, in general, first-in first-out (FIFO) buffers with a capacity of several words (bytes) are provided for the interface between the computer system and the magnetic disc in order to temporarily store information data.

The second feature of the present invention is to provide one-word buffers in the interface (storage controller 3 shown in FIG. 1) disposed between the computer system 1 and the backing storage unit 4. Additionally, the one-word buffers are provided for the ECC controller 19 of the array controller 15 (shown in FIG. 3) incorporated within the backing storage unit 4 in order to improve data transfer speed between the storage controller 3 and the storage array 17.

With reference to FIG. 1, the computer bus driver/receiver 5 and the storage bus driver/receiver 7 are each provided with one-word buffers for temporarily storing information data in transferring data between the CPU 1 and the backing storage unit 4.

Figure 5:
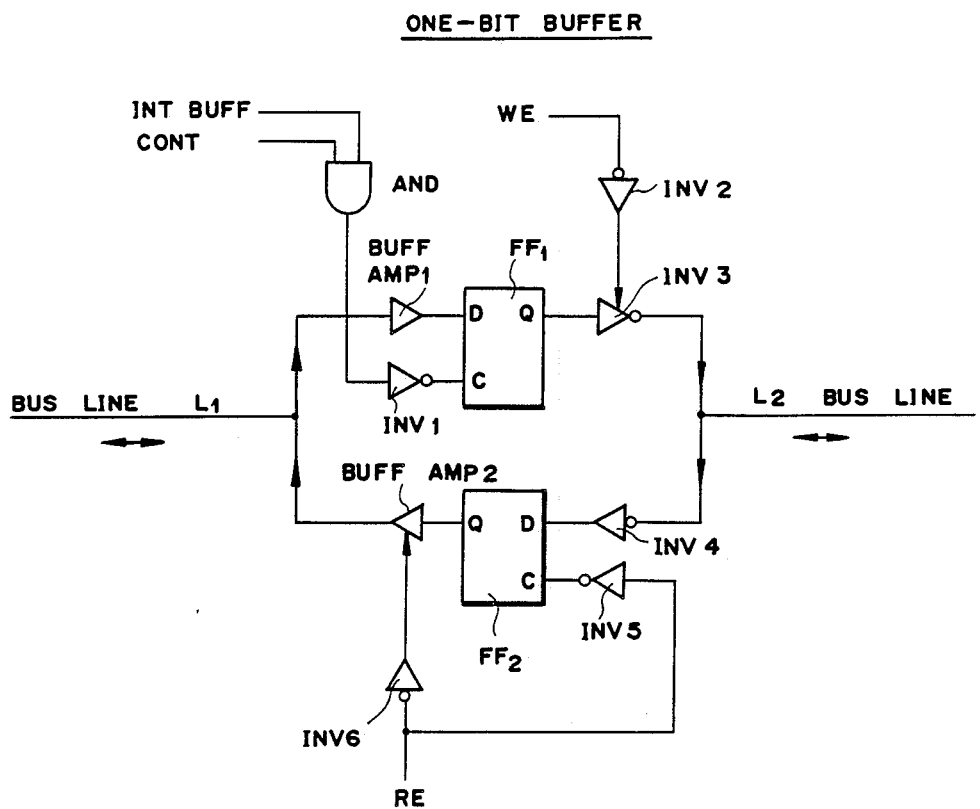
FIG. 5 is a schematic block diagram of a buffer memory circuit according to the present invention, which is arranged in a computer bus driver/receiver or a storage bus driver/receiver both incorporated within the backing storage controller shown in FIG. 1 or in the array controller shown in FIG. 3.

FIG. 5 shows an exemplary configuration of only the one-bit buffer. Therefore, each one-word buffer is made up of a plurality of one-bit buffers. The one-bit buffer is made up of a first data-latch type flip-flop $FF_1$, a second data-latch type flip-flop $FF_2$, an AND gate, several inverters 1, 2, 3, 4, 5 and 6, and two buffer amplifiers 1 and 2, for instance. The flip-flops $FF_1$ and $FF_2$ have a data input terminal D, a data output terminal Q and a clock pulse signal terminal C, respectively. Data transferred through a first bus line $L_1$ is supplied to the data input terminal D of the first flip-flop $FF_1$ via the buffer amplifier 1; an internal buffer command signal INT BUFF and another control signal CONT are applied to the clock pulse terminal C of the first flip-flop $FF_1$ via the AND gate and the inverter INV 1; an output signal (e.g. "1") of the first flip-flop $FF_1$ is applied to a second bus line $L_2$ via the inverter 3; a write-enable signal WE is applied to the inverter 3 via the inverter 2 to activate the inverter 3. Data transferred through the second bus line $L_2$ is supplied to the data input terminal D of the second flip-flop $FF_2$ via the inverter 4; a read-enable signal RE is applied to the clock pulse terminal C of the second flip-flop $FF_2$ via the inverter 5 and to the buffer amplifier 2 via the inverter 6; an output signal (e.g. "1") of the second flip-flop $FF_2$ is supplied to the first bus line $L_1$ via the buffer amplifier 2 activated by the inverter 6.

The data on the first bus line $L_1$ is latched by the first flip-flop $FF_1$ via the data terminal D thereof when an internal buffer command signal INT BUFF and the control signal CONT are applied to the clock terminal C thereof simultaneously, and then outputted to the second bus line $L_2$ from the output terminal Q thereof when a write-enable signal WE is applied to the inverter 2 to activate the inverter 3. In contrast with this, the data on the second bus line $L_2$ is latched by the second flip flop $FF_2$ via the data terminal D thereof when a read-enable signal RE is applied to the clock terminal C thereof, and then outputted to the first bus line $L_1$ from the output terminal Q thereof when the read-enable signal RE is reversed in polarity to activate the buffer amplifier 2.

Figure 6A:
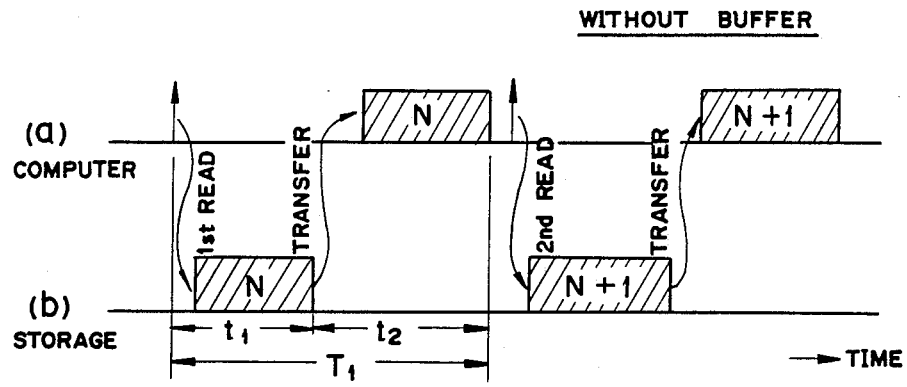
FIG. 6(A) is a timing chart for assistance in explaining conventional data access operation between the computer and backing storage device.

The effect of the above-mentioned one-word buffers will be described with reference to FIGS. 6(A) and (B). As already described, data are transferred between the computer system 1 and the backing storage unit 4 via the storage controller 3. The storage controller 3 converts address data prepared in magnetic disc access mode into those prepared in semiconductor element access mode in accordance with microprogram (in step $S_{14}$ shown in FIG. 2) and sends the converted address data to the semiconductor backing storage unit 4 as a leading address of data to be read out. The storage unit 4 stores this leading address. In response to the succeeding READ command signal, data stored in the semiconductor storage element are transferred into the buffer, thereafter incrementing the address automatically. Repeating the above-mentioned steps sequentially, data are transferred. As described above, it is possible to enhance data transfer speed by providing the one-word buffer in the backing storage controller 3 and by dividing the total time required for data transfer between the computer 1 and the backing storage unit 4 into a first time required for data transfer from the controller 3 to the computer 1 and a second time required when the storage unit 4 reads out data from the semiconductor storage element. Therefore, when data are read, for instance, from the storage unit 4 to the computer 1, a first data N is first transferred from the storage unit 4 to the buffer memory in response to a first read command signal. Thereafter, the data N stored in the buffer memory is transferred to the computer side, and simultaneously the succeeding data N+1 are read out in the storage unit 4 in response to the second read command signal and stored in the buffer memory. That is to say, while the storage unit 4 is reading out data from the semiconductor storage element, data stored in the buffer memory are transferred (read) to the computer side 1 in parallel processing.

The above operation will be described with reference to the attached drawings. FIG. 6A shows the case where the buffer memory are not provided. In this case, one-word data shown by (b) in FIG. 6(A) are read from the backing storage side 4 to the computer side 1 in response to a first read command as shown by (a) in FIG. 6(A). The time $t_1$ indicates an access time required for the semiconductor array; the time $t_2$ indicates an actual transfer time required for transferring data from the backing storage unit 4 to the computer 1 in accordance with direct access memory method. The total time $T_1$ is an addition of $t_1$ and $t_2$.

Figure 6B:
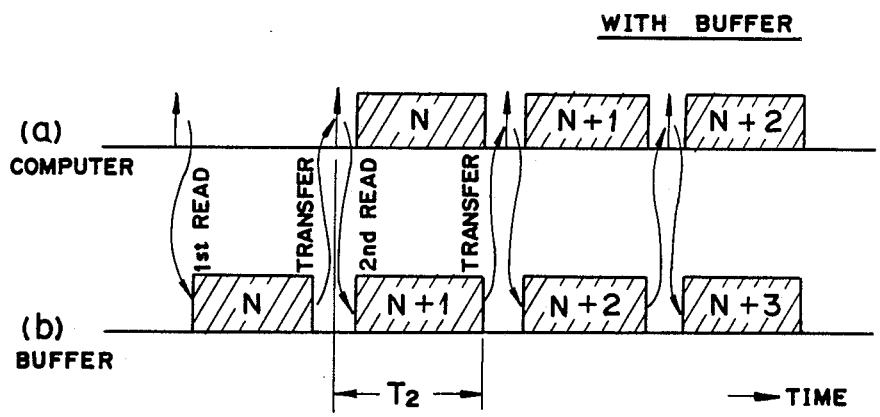
FIG. 6(B) is a timing chart for assistance in explaining data access operation between the computer and buffer memory circuit according to the present invention.

FIG. 6(B) shows the case where one-word buffers memory are provided. In this case, one-word data shown by (b) in FIG. 6(B) are first read from the backing storage side 4 to the one-word buffer in response to a first read command signal as shown by (a) in FIG. 6(B). While the one-word data N is transferred from the buffer to the computer side 1 in accordance with direct access memory method, address data of the succeeding one-word data N+1 shown by (b) in FIG. 6(B) are converted in response to the second read command signal and stored in the buffer.

Therefore, the transfer time $T_2$ is either longer one of the time required for data access (data conversion) or the time required for actual data transfer (from buffer to the computer), being capable of reducing the transfer time to approximately half of the conventional total transfer time $T_1$.

In the case where the one-word buffer is provided in the computer bus receiver/driver 7, this buffer serves to reduce transfer time in reading information data from the backing storage unit 4 to the computer 1.

Further, in the case where one-word buffer is provided in the error correction code controller 19 of the array controller 15 in the backing storage unit 4 (shown in FIG. 3), this buffer serves to reduce error correction code processing time. That is to say, while the controller 15 adds or extracts an error correction code to or from the transfer data, the preceding data stored in the buffer are sent from the ECC controller 19 to the storage controller 3 or to the storage arrays 17.

As described above, in the present invention, since one-word data buffer memory units are provided respectively for both the storage controller 3 (driver/receivers 7) and the ECC controller 19, it is possible to convert address data of the present data or execute error correction code processing for the present data while transferring the preceding data stored in the buffer. Therefore, it is possible to transfer data at high speed in synchronization with the transfer operation of direct memory access between the backing storage unit 4 and the computer 1.

Further, it is also possible to provide plural first-in first-out (FIFO) buffers having a capacity of several words for the storage controller 3 and the array controller 5 in place of the one-word buffers according to the present invention. In this method, however, control system or control processing implemented on the semiconductor storage side may become complicated as compared with the case where one-word buffers are provided.

The third feature of the present invention will be described hereinbelow with reference to FIGS. 7, 8 and 9.

In a multicomputer system, various methods have been adopted such as communication control computer link systems, shared memory systems, cross-call magnetic disc storage systems, etc. for transferring a great capacity of information data. In the case of the communication control computer link systems, since longer data transfer time is required due to the overhead (time required for decision functions) of communication protocol (method or procedure), it is impossible to transfer information data at high speed. In the case of the shared memory systems, since the shared storage memory is used in common with the internal main memory in order to facilitate the processing, it is impossible to increase the capacity of the storage memory infinitely. In the case of the cross-call magnetic disc, although the capacity thereof may be limitless, since there inevitably exists a longer access time (40 milliseconds) due to waiting time or head seek time caused by a rotating disc or a mechanical arm head, it is also impossible to transfer data at high speed.

The third feature of the present invention is to provide a shared memory which can read and write a great capacity of data at a high access speed and in cross-call method.

Figure 7:
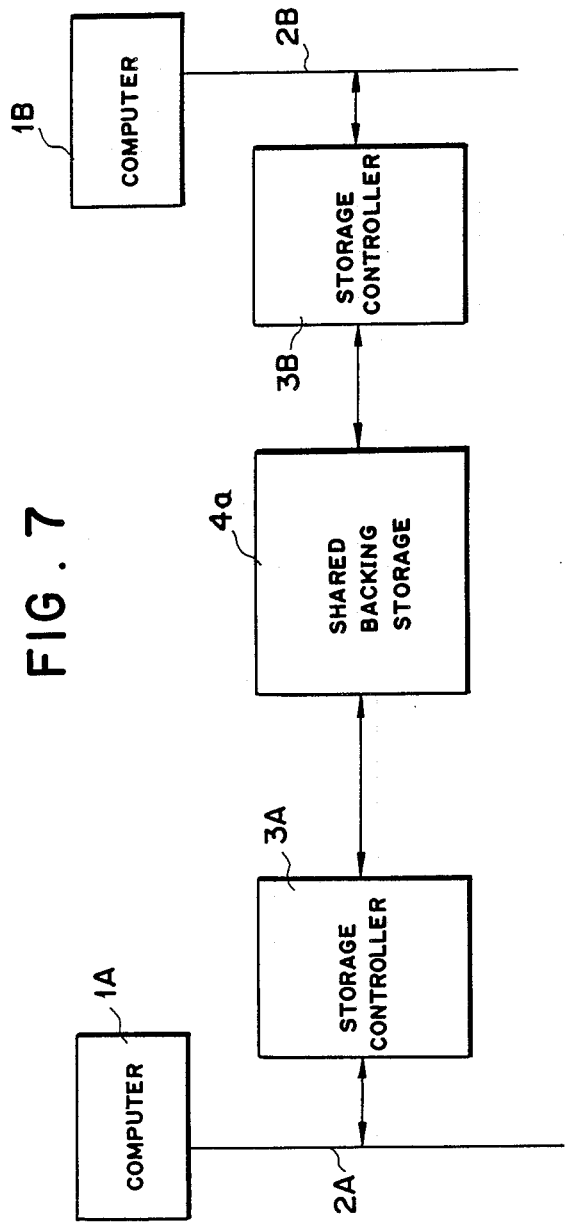
FIG. 7 is a schematic block diagram showing a shared backing storage device according to the present invention arranged between two computers in a multicomputer system.
Figure 8:
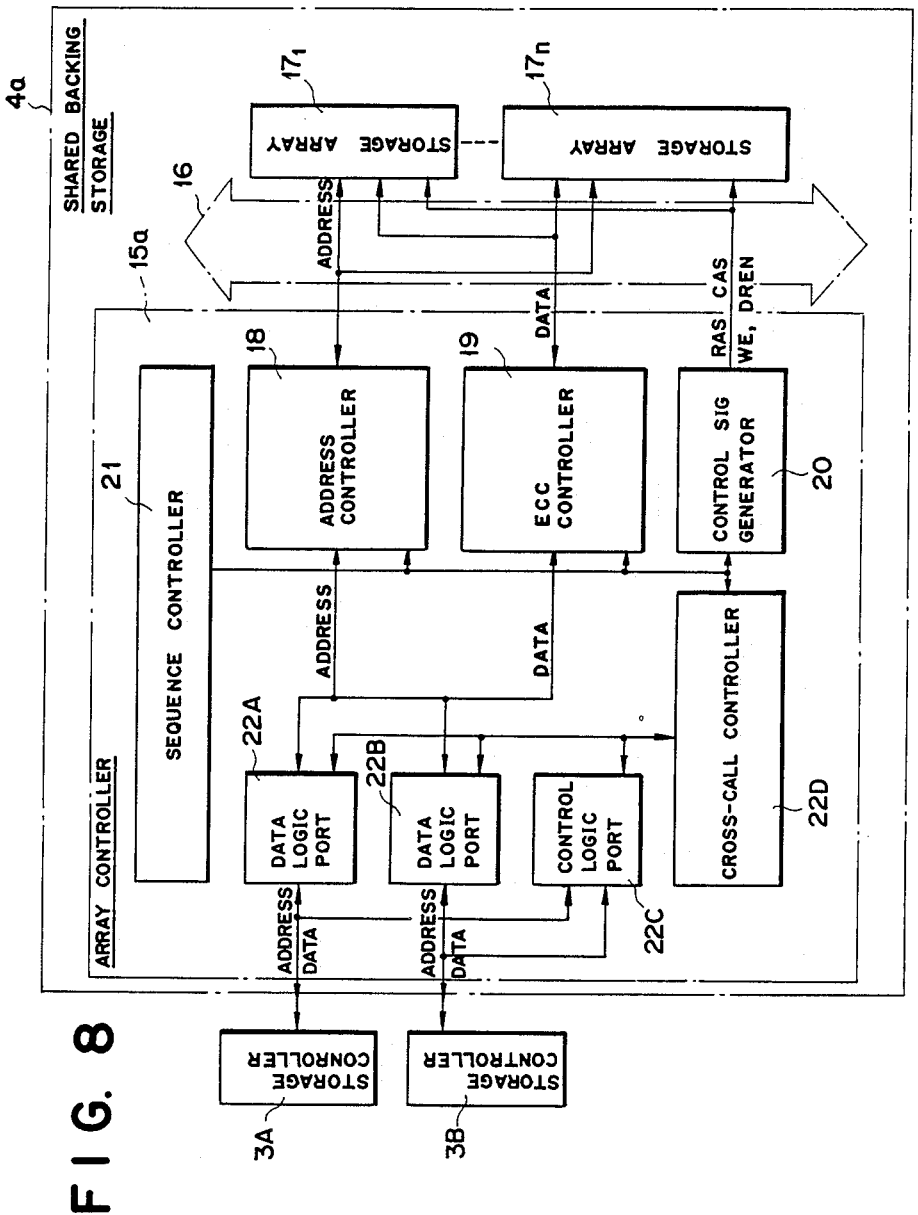
FIG. 8 is a schematic block diagram showing an array controller according to the present invention, which is disposed between two backing storage controllers shown in FIG. 7 and a plurality of semiconductor storage arrays, in which three logic ports and a cross-call controller are additionally provided for the array controller shown in FIG. 3.

FIG. 7 shows an embodiment in which a semiconductor backing storage unit 4a according to the present invention is used as a shared memory for a multicomputer system.

A plurality of computers 1A and 1B having an internal memory unit, respectively, therewithin are connected to a shared semiconductor backing storage memory 4a through a storage controller 3A or 3B and a CPU bus 2A or 2B. The computer 1A or 1B requests information data transfer to the shared backing storage memory 4a in the same access mode as in a shared magnetic disc device. That is, the storage controller 3A or 3B omits some processings required for a magnetic disc and converts data address peculiar to magnetic disc into those required for semiconductor memory in order to allow information data outputted from the computer in magnetic disc access mode to be readable or writeable to or from the semiconductor memory unit of the shared backing storage 4a. Further, the shared backing storage 4a allows the semiconductor memory unit to be accessible in cross-call function.

The configuration and operation of the storage controller 3A or 3B are quite the same as those of the storage controller 3 shown in FIG. 1 and described with reference to the flowchart shown in FIG. 2, therefore the description thereof being omitted herein.

When reference to FIG. 8, the configuration and operation of the shared backing storage 4a of the second embodiment according to the present invention will be described hereinbelow. The storage unit 4a is roughly made up of a storage array controller 15a, a bus 16, and plural semiconductor memory arrays $17_1 \ldots 17_n$. Further, the storage array controller 15a is made up of an address controller 18, an ECC (error correction code) controller 19, a control signal generator 20, a sequence controller 21, and cross-call function section 22 having two data logic ports 22A and 22B provided with memory function, a control logic port 22C provided with memory function and a cross-call controller 22D.

The storage controller 3A is connected to the data logic port 22A to transfer addresses and data associated with the computer 1A between the storage controller 3A and the shared backing storage 4a, and further connected to the control logic port 22C to apply control command signals (READ, WRITE, WRITE CHECK) to the port 22C. Similarly, the storage controller 3B is connected to the data logic port 22B to transfer addresses and data associated with the computer 1B and further connected to the common control logic port 22C to apply control command signals (READ, WRITE, WRITE CHECK) to the port 22C.

The cross-call controller 22D designates any one of the storage controllers 3A and 3B in response to the control signals applied to the control logic port 22C. If the storage controller 3A is designated, the cross-call controller 22D defines specific addresses to the data logic port 22A. If the storage controller 3B is designated, the cross-call controller 22D defines other specific addresses to the data logic port 22B. In case both the storage controllers 3A and 3B apply the control signals simultaneously to the control logic port 22C to request the use of the shared backing storage, the cross-call controller 22D allocates any one of the data logic ports 22A and 22B under priority or first-in first-out on the basis of interlock function. That is, data from one of the storage controllers 3A and 3B are stored temporarily until data from the other of the controllers 3A and 3B have been transferred. The above function is called cross-call function. Further, the cross-call controller 22D activates the control signal generator 20 on the basis of interlock function or cross-call function to output control command signals (RAS, CAS, WE, DREN).

The address data derived from the data logic ports 22A and 22B are given to the address controller 18. The information data derived from the data logic ports 22A and 22B are given to the error correction code controller 19.

The address controller 18 selects areas allocated to one of the storage arrays $17_1 \ldots 17_n$ on the basis of the address data supplied from the data logic ports 22A or 22B and outputs address selection signals together with the address designation signals. The ECC controller 19 adds a word error correction code (WORD ECC) to data to be written and extracts a word error correction code from read data. In case an error is found, the ECC controller 19 automatically corrects the transferred data to correct ones and transfers the corrected data between the storage controller 3A or 3B and the storage arrays $17_1 \ldots 17_n$. The control signal generator 20 generates various control signals necessary for writing and reading data into or out of the storage arrays $17_1 \ldots 17_n$. These control signals are, for instance, row address strobe signal (RAS), column address strobe signal (CAS), write-enable signal (WE), read-enable signal (RE), and drive-enable signal (DREN) in the case where a dynamic RAM is used for the semiconductor storage unit 4.

The sequence controller 21 controls input/output operation sequence of the controllers 18 and 19 and the control signal generator 20. In summary, the storage array controller 15a is connected to the storage arrays $17_1 \ldots 17_n$ via the bus 16 in order to designate addresses of the arrays and to control data reading and writing on the basis of cross-call function.

The backing storage device according to the present invention has been described of the embodiment in which a single backing storage device is incorporated with a single or plural computers. However, it is also possible to provide a plurality of semiconductor backing storage devices arranged in parallel with each other for a computer system or a multi-computer system.

Figure 9:
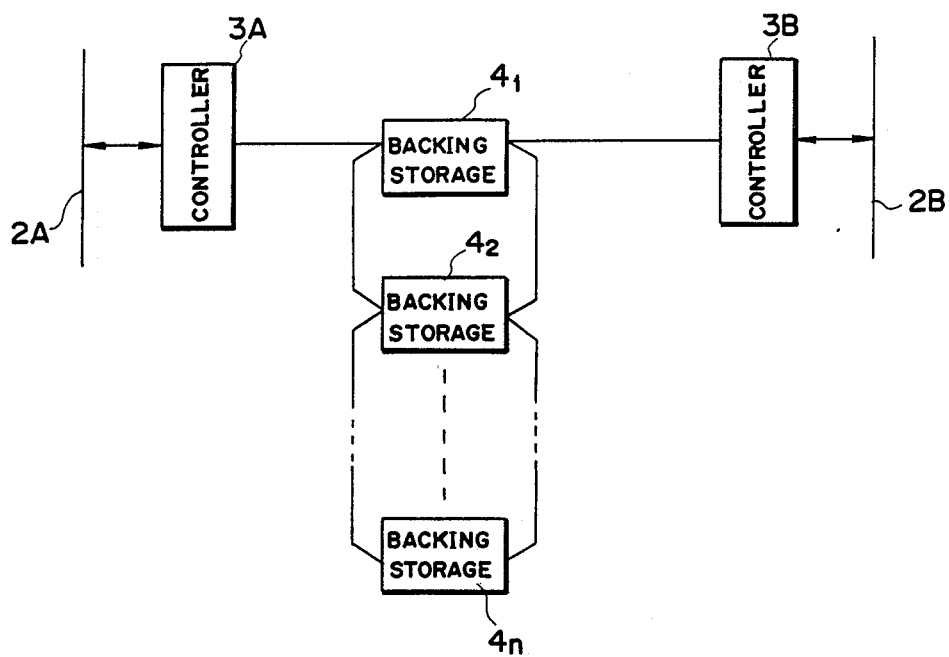
FIG. 9 is a schematic block diagram showing a plurality of backing storage devices according to the present invention arranged in parallel between two computers in a multicomputer system.

FIG. 9 shows an embodiment in which plural backing storage devices $4_1 \ldots 4_n$ are incorporated with a pair of computers 3A and 3B. In such embodiment as described above, it is necessary to provide a device selecting function as follows: each computer 3A or 3B generates a backing storage device selection signal; this signal is applied to the backing storage devices $4_1 \ldots 4_n$ through the computer buses; the cross-call controller 22D of the array controller 15a in each shared backing storage 4a (shown in FIG. 8) selects itself in response to this device selection signal.

As described above, in the backing storage device according to the present invention, since semiconductor memory units are used as backing storage elements and since the storage controller so configured as to emulate a magnetic disc controller is connected between computers and the semiconductor backing storage units, in such a way that various access controls peculiar to magnetic disc devices are omitted or prepared and address data for magnetic discs are converted into those for semiconductor memory units, the advantages are: (1) it is possible to markedly reduce access time to approximately several hundred microseconds as compared with the conventional magnetic disc access time (several tens milliseconds); (2) computer systems can access the semiconductor backing storage devices in the same access mode as in magnetic disc; that is, it is possible to directly connect the semiconductor backing storage units according to the present invention to computer systems so configured as to access magnetic disc backing storage devices.

Since the semiconductor backing storage device according to the present invention does not necessitate complicated protocol as in communication control systems, it is also possible to eliminate transfer delay time caused by software overhead. Further, since highly-integrated semiconductor memory elements have recently been developed, it is possible to realize a small-scale highly-reliable, great-capacity backing storage device. In addition, in the access method according to the present invention, data transfer between computers and backing storage device is implemented for only the actual data excluding bit-synchronizing data, it is also possible to enhance storage efficiency without storing extra data.

Further, in the backing storage device according to the present invention, since one-word buffers are provided for the storage controller and the backing storage device, respectively, it is possible to further improve data transfer speed.

Furthermore, in the backing storage memory according to the present invention, since cross-call functions are provided for the array controller in the backing storage device, it is possible to directly connect the semiconductor storage devices as a shared backing storage to a multicomputer system so configured as to access magnetic disc backing storage.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. A data processing system including an apparatus for auxiliary storing data transferred from a computer via a computer bus, said apparatus comprising:
   (a) first means, including a semiconductor memory and memory bus;
   (b) second means interposed between the computer bus and the memory bus for converting a first access mode signal for the magnetic disc memory from the computer into a second access mode signal for the semiconductor memory and controlling data transfer between a central processing unit (CPU) of the computer and the first means, the CPU transmitting and receiving address data to and from the first means, in transferring information data between the computer and the semiconductor memory, the second means omitting data access control command signals from the CPU to the semiconductor memory, while providing access control command signals from the CPU unique to the magnetic disc access mode and converting the address data to and from the CPU unique to the magnetic disc access mode into address data for the semiconductor memory access mode, and omitted data access control command signals being DISC SELECT DRIVE, PACK ACKNOWLEDGE, DRIVE CLEAR, UNLOAD, START SPINDLE MOTOR, RECALIBRATE, OFF SET, and WRITE HEADER, the other non-omitted data access control command signals being SEEK, READ, WRITE, READ HEADER and WRITE CHECK, the prepared data access control command being HEADER, the addressed data unique to the magnetic disc access mode being CYLINDER, TRACK, HEAD, and SECTOR, and the address data unique to the semiconductor access mode being POW ADDRESS STROBE and COLUMN ADDRESS STROBE.

2. An apparatus as set forth in claim 1, wherein a plurality of said semiconductor memories are connected in parallel to said computer bus.

3. An apparatus for auxiliary storing data transferred from a computer via a computer bus, comprising:
   (a) first means including a semiconductor memory and a storage bus; and
   (b) second means interposed between the computer bus and the storage bus for converting an access mode signal from the computer into a second access mode signal for the semiconductor memory and controlling data transfer between a central processing unit (CPU) of the computer and the first means in response to the converted access mode signal, wherein said second means comprises:

(c) computer bus driver/receiver means connected to the computer bus for receiving from said CPU said data access control command signals, address data and information data prepared in magnetic disc access mode and transmitting to said CPU control signals of direct memory access, interrupt signals, data access control command signals, address data and information data prepared in said magnetic disc access mode;

(d) storage bus driver/receiver means connected to the storage bus for receiving information data read from said semiconductor memory and transmitting to said semiconductor memory data access control command signals of READ, WRITE, WRITE CHECK, and address data necessary for semiconductor memory access and information data to be written in said semiconductor memory;

(e) a condition code multiplexer means connected to said computer bus driver/receiver means for poll-scanning said computer bus driver/receiver means to check sequentially whether the computer is accessing said semiconductor memory and for outputting said data access control command signals;

(f) microprogram sequencer means connected to said condition code multiplexer means for generating microprogram address designation signals in sequence in response to the data access control command signals and clock pulse signals generated by a system clock;

(g) read only memory means connected to said microprogram sequencer for outputting microprogram instructions in response to the microprogram address designation signals;

(h) register means connected to said read only memory means, said microprogram sequencer means and said condition code multiplexer means for inputting the microprogram from said read only memory there into as microinstructions in response to said clock pulse signals and for outputting succeeding sequencer addresses and instruction signals to said microprogram sequencer means and a multiplexer control signal to said condition code multiplexer means;

(i) random access memory means connected to said computer bus receiver/driver means, said storage bus receiver/driver means and said register means for temporarily storing addresses, data, information data, data access control command signals, etc.; and (j) microprocessor means connected to said computer bus receiver/driver means, said storage bus receiver/driver means, said random access memory means, and said register means for writing/reading information data in or out of said semiconductor memory in response to command signals received through said computer bus driver/receiver means in accordance with the microprogram instructions transferred from said read-only memory means to said register means, said microprocessor means including means for analyzing said data access control command signals, omitting data access control command signals peculiar to said magnetic disc access mode, means for selecting data access control command signals of READ, WRITE, READ HEADER and WRITE CHECK necessary for transferring information data between the computer and said semiconductor memory, means for reading information data from said semiconductor memory, means for preparing a magnetic disc header in accordance with the microprogram instructions and converting address data peculiar to the semiconductor memory access mode into address data necessary for the magnetic disc access mode in accordance with the microprogram, and means for writing information data in said semiconductor memory, and converting said address data peculiar to the magnetic disc access mode to address data necessary for the semiconductor memory access mode in accordance with the microprogram instructions, so that information data may be transferred between the computer and said semiconductor memory.

4. An apparatus as set forth in claim 3, which further comprises an error correction code control means connected to a data bus disposed between said computer bus driver/receiver and said storage bus driver/receiver said error correction control means including means for adding an automatic error correction code to information data in writing information data to said semiconductor memory, and means for checking the added error correction code and automatically correcting checked information data in case of presence of error in reading information data from said semiconductor memory.

5. An apparatus for auxiliary storing data transferred from a computer via a computer bus, comprising:

(a) first means including a semiconductor memory and a storage bus;

(b) second means interposed between the computer bus and the memory bus for converting a first access mode signal from the computer into a second access mode signal for the semiconductor memory and controlling data transfer between a central processing unit (CPU) of the computer and the first means in response to the converted access mode signal, wherein the semiconductor memory comprises:

(c) semiconductor storage array means for storing said information data; and (d) semiconductor array control means comprising:

(1) address control means connected between said second means and said semiconductor storage array means for receiving address data from said storage control means, for generating signals to select areas to be allocated to said storage array means in response to the address data, and for outputting address data and address selection signals together;

(2) error correction code control means connected between said second means and said semiconductor storage array means, said error correction code control means including means for receiving information data to be read out of or written in said semiconductor memory, means for adding a word error correction code to said information data, means for checking said added word correction code in reading the information data, and means for automatically correcting said read information data in case of presence of error;

(3) control signal generating means connected between said second means and said storage array means for generating control signals that are supplied to said semiconductor storage array and are necessary for transferring information data between said second means and said semiconductor storage array means;

(4) sequence control means connected to said address control means, said error correction code control means and said control signal generating means for generating control signals to sequentially and timingly control said address control means, said error correction code control means and said control signal generating means.

6. An apparatus as set forth in claim 5, wherein control signals generated by said control signal generating means include row address strobe (RAS), column address strobe (CAS), write-enable (WE), read-enable (RE), and drive enable (DREN) in the case where said semiconductor storage array means is a dynamic random access memory.

7. An apparatus as set forth in claim 5, wherein said semiconductor storage array means comprises:
(a) semiconductor storage element means storing said information data;
(b) address selection logic means connected between said address control means and said storage element means for generating address data signals to said semiconductor storage element means in response to address data signals from said address control means;
(c) address matrix selection control means connected between said control signal generating means and said semiconductor storage element means and to said address selection logic means for generating row address selection signals and column address selection signals to said semiconductor storage element means in response to row address signals and column address signals from said control signal generating means and the address data signals from said address selection logic means;
(d) write enable signal generating means connected between said control signal generating means and said semiconductor storage element means and to said address selection logic means for outputting a write control signal WR to said storage element means in response to a write enable signal from said control signal generating means and address data signals from said address selection logic means;
(e) write buffer means connected between said error correction code control means and said semiconductor storage element means for writing said information data received from said error correction control means in said semiconductor storage element means in response to the write control signal WR from said write enable signal generating means; and
(f) read buffer means connected between said control signal generating means and said error correction code control means, and said semiconductor storage element means and to said address selection logic means for reading information data from said semiconductor storage element means in response to a data read signal from said control signal generating means and the address data signal from said address selection logic means, said information data being transferred from said read buffer means to said error correction code control means.

8. An apparatus as set forth in claim 3, wherein said computer bus driver/receiver means and said storage bus driver/receiver means both comprise therein one-word buffer means, respectively, for temporarily storing information data in transferring information data between the computer and said semiconductor memory in order that a succeeding information data is transferred to said buffer means while the current information data are transferred from said buffer means.

9. An apparatus as set forth in claim 5, wherein said error correction code control means comprises therein one-word buffer means for temporarily storing information data in transferring information data between said second means and said semiconductor memory in order that a succeeding information data are EEC processed and transferred to said buffer means while current information data are transferred from said buffer means.

10. An apparatus as set forth in claim 8, wherein each one-word buffer means includes a plurality of one-bit buffers each of which comprises:
(a) a first flip-flop means for latching information data on a first bus line in response to an internal buffer signal and outputting the latched data onto a second bus line in response to a write command signal;
(b) a second flip-flop means connected in parallel with said first flip-flop means for latching data on the second bus line in response to a read command signal and outputting the latched data onto the first bus line in response to an inversed read command signal.

11. An apparatus as set forth in claim 9, wherein each one-word buffer means includes a plurality of one-bit buffers each of which comprises:
(a) a first flip-flop means for latching information data on a first bus line in response to an internal buffer signal and outputting the latched data onto a second bus line in response to a write command signal; and
(b) a second flip-flop means connected in parallel with said first flip-flop means for latching data on the second bus line in response to a read command signal and outputting the latched data onto the first bus line in response to an inversed read command signal.

12. An apparatus as set forth in claim 5, wherein said semiconductor memory is shared by plural computers via plural second means, said semiconductor memory comprises semiconductor array control means connected between said plural second means and said semiconductor storage array means, said semiconductor array control means further comprises:
(a) a first data logic port means connected between a first of said second means, and said address control means and said error code correction control means for temporarily storing addresses and information data supplied from said first of said second means;
(b) a second data logic port means connected between a second of said second means, and said address control means and said error code correction control means for temporarily storing addresses and information data supplied from said second of said second means;
(c) a control logic port means connected to said first and second of said second means for storing and outputting control signals of READ, WRITE and WRITE CHECK generated separately from said first and second of said second means; and
(d) cross-call control means connected to said first and second data logic port means, said control logic port means and said sequence control means said cross-call control means including means for designating one of said first and second data logic port means in response to the control signals outputted from said control logic port means under priority or a first-in first-out condition, means for defining specific addresses in said semiconductor storage array means for information data outputted from said designated data logic port means, and means for interlocking address and information data both stored in one of said first and second data logic ports in case both said first and second of said second means generate access signals to said shared semiconductor memory simultaneously.

* * * * *